United States Patent [19]

Scannell

[11] Patent Number: 4,626,159
[45] Date of Patent: Dec. 2, 1986

[54] MACHINE LOADER

[75] Inventor: James D. Scannell, Grosse Pointe Farms, Mich.

[73] Assignee: Lamb Technicon Corp., Warren, Mich.

[21] Appl. No.: 674,027

[22] Filed: Nov. 21, 1984

[51] Int. Cl.⁴ .................................. B65G 47/06
[52] U.S. Cl. ....................... 414/112; 198/468.6; 414/742
[58] Field of Search ............ 414/112, 680, 742; 198/487, 488, 490, 468.6

[56] References Cited

U.S. PATENT DOCUMENTS

| 1,479,809 | 1/1924 | Headley et al. | 198/488 |
| 2,615,558 | 10/1952 | Reed | 198/488 |
| 3,913,749 | 10/1975 | Wyers | 414/742 |
| 4,276,979 | 7/1981 | Buschmann | 414/680 X |
| 4,364,706 | 12/1982 | Kranzlmuller | 414/742 X |

FOREIGN PATENT DOCUMENTS

| 2353009 | 5/1974 | Fed. Rep. of Germany | 198/488 |
| 2322941 | 11/1974 | Fed. Rep. of Germany | 198/487 |

Primary Examiner—Leslie J. Paperner
Attorney, Agent, or Firm—Barnes, Kisselle, Raisch, Choate, Whittemore & Hulbert

[57] ABSTRACT

A loader for relatively long, flexible strips of sheet stock has a pair of parallel, generally vertically extending arms having vertically slotted upper ends. The lower ends of the arms are pivotally connected with vertically guided slide blocks. Each arm is pivotally connected intermediate its ends with a mechanism for moving the upper slotted ends of the arms in an elliptical path lying in a vertical plane. The elliptical path is such that, at one position therein, a strip of sheet stock slid off the top of a stack of such strips gravitates edgewise into the slots in said arms and, in another position, the strip in the slotted ends of the arms is deposited edgewise into vertical slots in the rails of a strip conveyor.

16 Claims, 5 Drawing Figures

MACHINE LOADER

This invention relates to a machine for loading long slender workpieces into a machine or conveying apparatus.

In the manufactured of sheet metal products the sheet stock is frequently received in the form of stacks or bundles of individual strips. When relatively long and slender strips of sheet stock are arranged one upon another in a relatively large stack, the stack can be handled easily and conveniently by means of a forklift truck or crane because the stack as a whole is relatively rigid. However, when it becomes necessary to handle the individual strips, an operator must remove the strips one at a time from the stack and manually place them on the machine in which they are to be processed or on a loading mechanism for the machine. Long narrow strips of sheet stock are normally difficult to handle manually becuase they are extremely flexible. This is particularly true when the strips are supported so that they lie in a generally horizontal plane. They can be handled much more readily when they are oriented in a generally vertical plane since they do not tend to sag or buckle because of their weight.

The present invention has for its primary object the provision of an apparatus capable of loading sheet stock, particularly long narrow strips, into a machine in a simple and efficient manner.

A more specific object of this invention is to provide a machine loader of relatively simple design and economical construction that is very reliable in operation.

More specifically, the loader of this invention contemplates a support on which a stack of sheet metal strips may be placed in a manner such that the uppermost strip can be slid off the top of the stack by an operator and caused to drop in a generally vertically oriented position into receiving slots of a pair of loader arms. The loader arms are operated by a mechanism which imparts to the slotted ends thereof an elliptical path lying in a vertical plane such as to deposit the strips while in a generally vertically oriented position into generally vertically extending slots in a walking beam conveyor.

These and other objects, features and advantages of the present invention will become apparent from the following description and accompanying drawings, in which.

Figure 2:
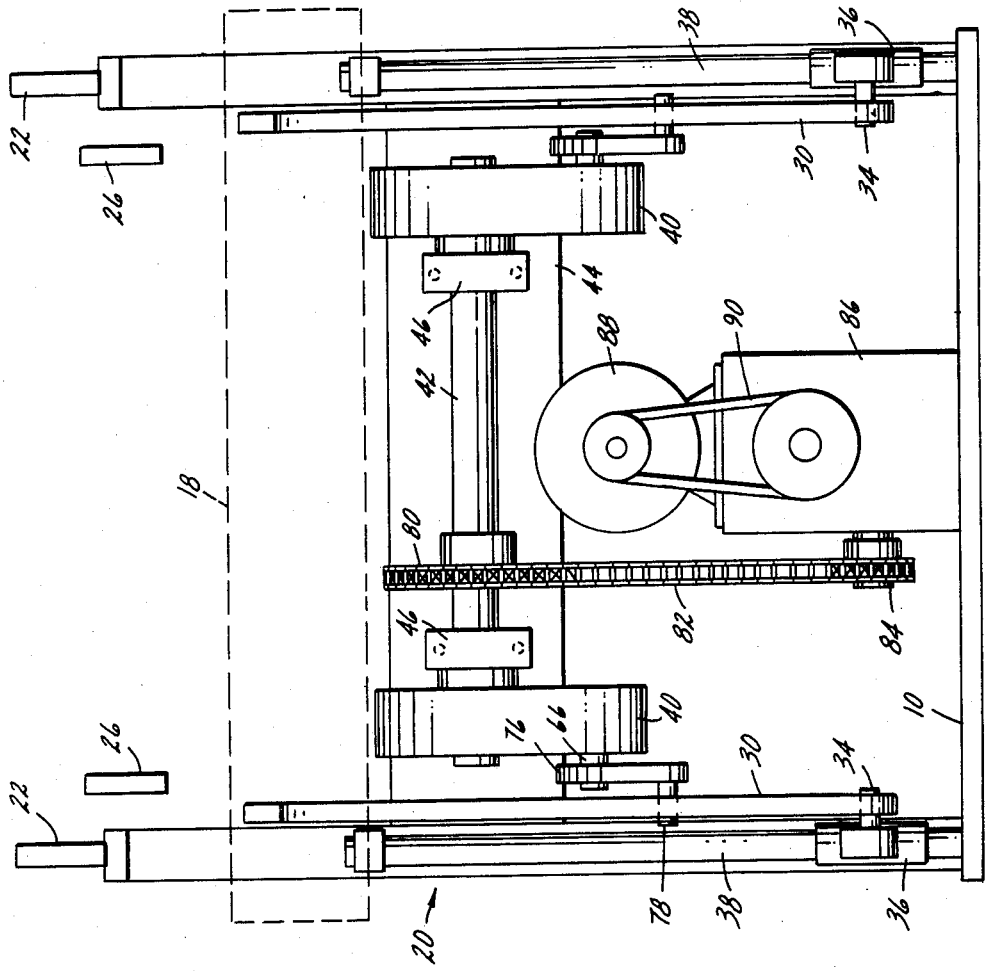
FIG. 2 is an end view of the machine shown in FIG. 1.
Figure 1:
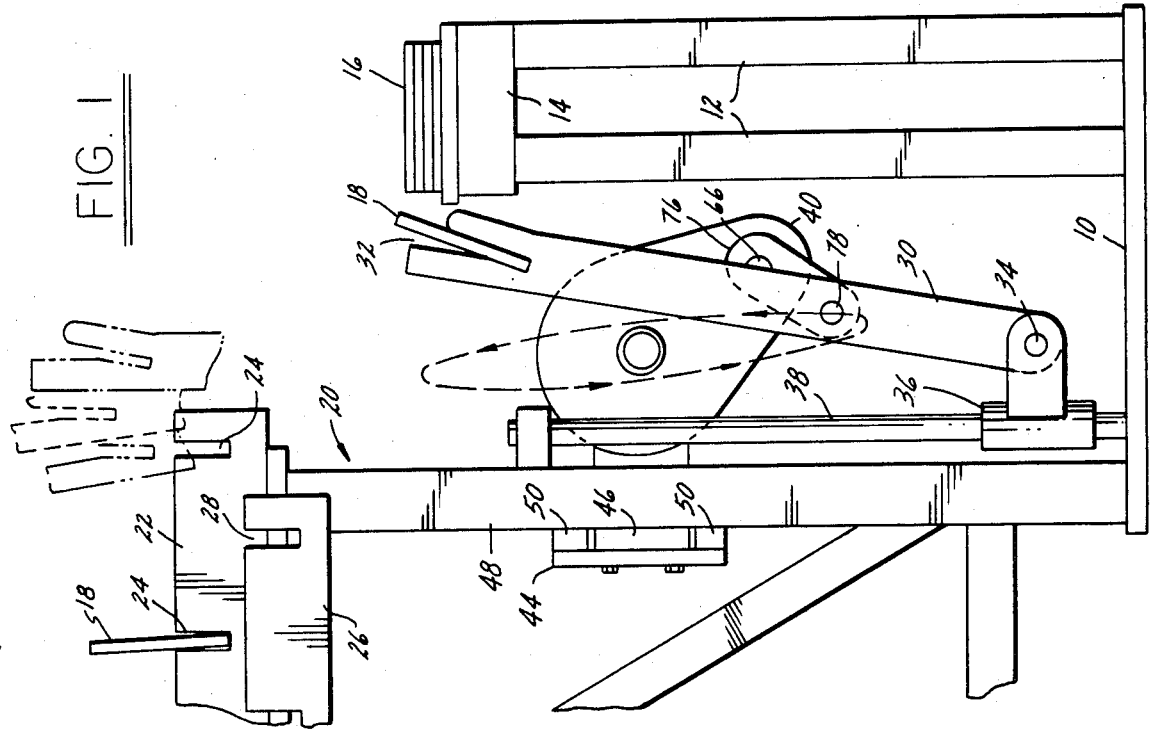
FIG. 1 is a fragmentary side elevational view of a machine loader according to the present invention.

Referring first to FIGS. 1 and 2, the machine of the present invention includes a base plate 10 on which is mounted by a pair of legs 12 a support table 14 on which a stack 16 of sheet metal strips 18 is arranged to be supported. Adjacent the support table 14 there is mounted, preferably on plate 10, one end of a walking beam conveyor 20 having a pair of laterally spaced stationary rails 22 provided with vertical slots 24 extending to the upper edges thereof. Slots 24 in the two rails 22 are laterally aligned and spaced regularly along the length of the rails. Conveyor 20 also includes a pair of laterally spaced carrier rails 26 which are likewise provided with laterally aligned slots 28 spaced apart lenghtwise of the rails to correspond with the spacing of slots 24. Conveyor 20 includes a mechanism (not illustrated) for causing rails 26 to move in a vertical rectangular path. The rail lifting mechanism is designed to move rails 26 from the position shown in FIG. 1 first horizontally to the right as viewed in FIG. 1 to a position wherein slots 28 are aligned with slots 24, then verticaly upward to lift all the strips in slots 24 above the upper edges of rails 22, then horizontally to the left to a position wherein slots 28 are again vertically aligned with slots 24 and then vertically downward to deposit the strips 18 in the slots 24 advanced one increment from their previous position. Thereafter the rails 26 are moved horizontally to the right to return them to their starting position. Thereafter the rails 26 are moved horizontally to the right to return them to their starting position.

The strip loading mechanism comprises a pair of generally vertically extending, laterally spaced loader arms 30 having laterally aligned slots 32 at their upper ends. The lower end of each arm 30 is pivotally connected, as at 34, to a slide block 36 which is vertically slideable on a vertically extending guide bar 38 at each side of conveyor 20. Each loader arm 30 is driven by an actuator 40. Actuators 40 are supported at the opposite ends of a common shaft 42 journalled on a support plate 44 by pillow blocks 46. Support plates 44 extends between and is mounted on the legs 48 at the inlet end of conveyor 20 by spacer blocks 50.

Figure 3:
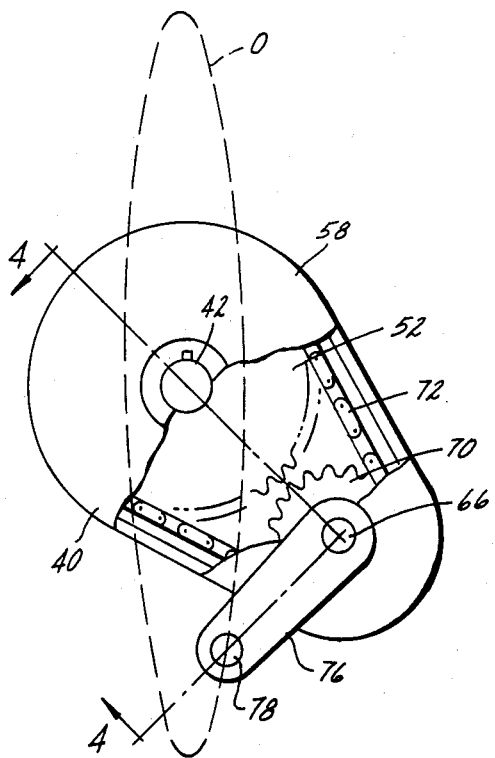
FIG. 3 is a side view, the parts broken away, showing the actuator for generating the elliptical path of the slotted ends of the loader arms.
Figure 4:
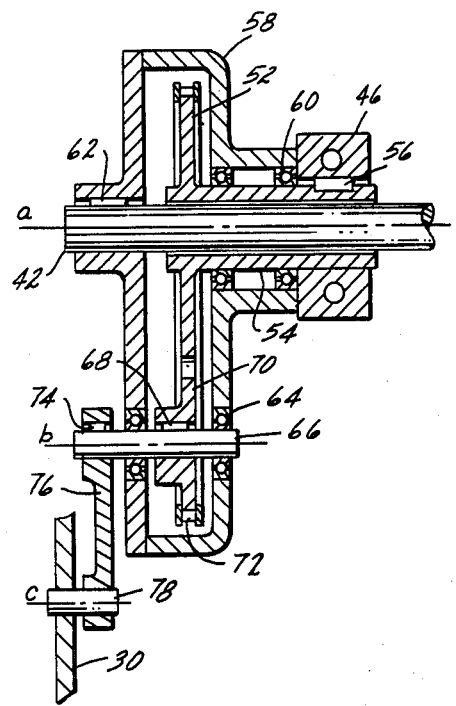
FIG. 4 is a sectional view along the line 4—4 in FIG. 3.

The construction of actuators 40 is illustrated in FIGS. 3 and 4. Each actuator has a sun sprocket 52 provided with a hub extension 54 keyed, as at 56, to the adjacent pillow block 46. A housing 58 is journalled by bearings 60 on each hub extension 54. Each housing 58 is keyed to shaft 42 as at 62. Within each housing there is journalled, as by bearings 64, a short shaft 66 to which is keyed, as at 68, a planetary sprocket 70. Planetary sprocket 70 is driven from sun sprocket 52 by a chain 72 extending around these sprockets. On each shaft 66 there is keyed, as at 74, a crank 76. The free end of each crank 76 is connected to the adjacent loader arm 30 by pivot pin 78.

Shaft 42 has a driven sprocket 80 keyed thereto that is connected by a chain 82 to the output sprocket 84 of a gear box 86. Gear box 86 is driven by a motor 88 through a belt and pulley arrangement 90. As explained hereinafter, means are provided for momentarily interrupting the rotation of shaft 42 once during each revolution thereof.

In the above described arrangement each housing 58 rotates with shaft 42. The diameter of sprocket 52 is twice the diameter of sprocket 70. Therefore, when shaft 42 rotates housing 58 through one revolution, sprocket 70 will be rotated through two revolutions. The axis of shaft 42 is designed a; the axis of shaft 66 is designed b; and the pivotal axis 78 is designated c. The distance between axes a and b is greater than the distance between axes b and c. When shaft 42 revolves through one revolution sprocket 70 will have completed one orbit around sprocket 52 and will have rotated through two complete revolutions. Therefore, the pivot connection 78 will travel the orbital path designated O. In view of the dimensional relationships between axes a, b and c, the major axis of the elliptical path O will extend vertically and its short minor axis will extend horizontally. It will be understood that, if the distance between the axes a and b were equal to the distance between axes b and c, then the path of movement of the pivotal connection 78 would be a straight vertical line. Likewise, if the distance between axes b and c were infinitely short, then the path of travel of the pivot axis 78 would be nearly circular. In view of the fact that the support table 14 is spaced horizontally from the endmost slot 24 in rail 22, it is essential that the path of movement of the pivot axis 78 be elliptical. It will be appreciated that, since the pivot axes 78 are located intermediate the ends of the loader arms 30, the slotted upper ends of these loader arms will travel an orbital path somewhat similar to, but wider than, the orbital path of the pivot axis 78.

In the arrangement illustrated the actuators 40 are mounted on plate 44 so that the orbital paths of the pivot connections 78 are inclined upwardly slightly toward the conveyor 20. Means (not illustrated) are provided for momentarily arresting the movement of motor 88 whenever the loader arms 30 arrive at the position illustrated in FIG. 1. When the arms 30 are so located, an operator manually slides the uppermost strip 18 off the top of stack 16 to the left, which, through gravity, tumbles into slots 32 of the two arms 30. Motor 88 then starts and, through shaft 42, both actuators 40 start to rotate and, through the crank pins 78 which follow the orbital paths O, drive the loader arms 30 upwardly so that the upper slotted ends thereof travel through an elliptical path and deposit the strip 18 into the endmost slots 24 of rails 22. After depositing the strips into these slots, the arms 30 continue their downward movement and will again stop near the bottom of their path in the position shown in FIG. 1.

After a strip is deposited in the endmost slots of rail 22, rails 26 are actuated in the manner previously described to lift all of the strips 18 out of the slots 24 in rails 22 and advance them to the left one pitch and thus deposit the strips in the next successive slots 24. Thus, in repetitive cycles of the loader arms 30 and the conveyor 20, the strips are advanced one at a time from the stack 16 on table 14 to the conveyor 20 and from the conveyor 20 to the desired manufacturing process (not illustrated). It will be observed that the mechanism herein described is designed to retain the arms 30 in a generally vertically oriented position at all times. Thus, each strip 18 seated in the slots 32 of arms 30 is retained in a generally vertically oriented position so that it will not tend to buckle by reason of its own weight, which would occur if the strips were retained in a generally horizontally oriented position.

Figure 5:
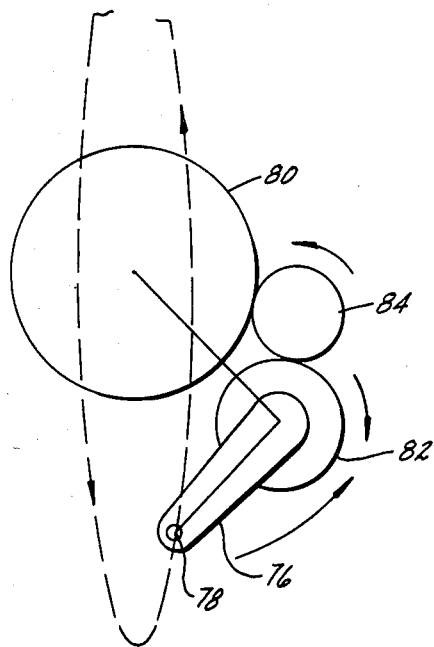
FIG. 5 is a somewhat diagrammatic view of a modified form of actuator for the loader arms.

The actuator shown in FIG. 5 in principle operates exactly the same as the actuator shown in FIGS. 3 and 4. However, instead of using sprockets and chains, in the arrangement shown in FIG. 5 a sun gear 80 is arranged to be keyed to shaft 42 and a planetary gear 82 is connected to sun gear 80 by an idler gear 84. The idler gear 84 is utilized merely to achieve the proper direction of rotation of planetary gear 82 as shown in FIG. 5. The dimensional relationships between sun gear 80 and planetary gear 82 relative to the length of crank arm 76 are the same as previously described in connection with FIGS. 3 and 4.

What is claimed is:

1. A machine for loading long flexible strips of sheet stock onto a machine comprising a base, a support fixed relative to said base and on which a stack of said strips is adapted to be arranged such that the uppermost strip can be slid off the top of the stack, a slide carried by said base and constructed and arranged for movement generally vertically with respect to said base, a pair of laterally spaced apart and parallel loader arms each pivotally mounted on said slide, extending generally vertically and constructed and arranged for movement in a generally vertical plane, each of said arms having a generally vertically extending slot therein, a strip receiving device adjacent said arms having a pair of laterally spaced, generally vertically extending slots therein, the slots in said arms and said receiving device having open upper ends for receiving and supporting said strips edgewise in a generally vertically oriented position, a drive carried by said base for moving said arms such that the slotted portions thereof remain in a generally vertically oriented position while moving throughout a generally elliptical path lying in a generally vertical plane and adjacent said stack and said receiving device, said elliptical path extending from above to below both said support and the slots in said strip receiving device and having its major axis extending generally vertically, said arms at one location in said path being oriented such that the vertical slots therein are positioned to receive in edgewise position a strip slid off the top of the stack, said path having a portion wherein the slots in said arm move generally vertically downwardly into alignment with the slots in the strip receiving device so that, when the slotted portions of the arms move downwardly past the receiving device, the strip supported in the slots of said arms is deposited in the slots of the receiving device, and said drive having a rotatable input member, an output member pivotally connected to said arms, means interconnecting said input and output members, and said drive being constructed and arranged to cause said pivotal connection of said output member to orbit around the axis of rotation of said input member in an elliptical path with its major axis extending generally vertically.

2. A machine as called for in claim 1 wherein the loader arms are supported for pivotal movement at one end on said guide and the slots therein are formed adjacent the opposite end portions thereof, said drive for moving said arms being connected thereto intermediate the ends of the arms.

3. A machine as called for in claim 2 wherein the arms are vertically inclined and the slots therein are disposed adjacent the upper ends thereof.

4. A machine as called for in claim 3 including a vertically inclined guide on said base, said slide being vertically shiftable on said guide, and the lower ends of said arms being pivotally connected with said slide.

5. A machine as called for in claim 1 wherein the vertical plane of movement of said output member extends in a direction transverse to the pivot axes of said arms.

6. A machine as called for in claim 1 wherein said drive for moving the arms comprise a stationary sun member on said base, a rotatable planetary member having its axis spaced from the axis of the sun member, means for rotating the planetary member around the axis of the sun member, means forming a peripheral driving connection between the sun and planetary members so that the planetary member rotates about its own axis when it is rotated around the axis of the sun member, a crank fixed relative to said planetary member to rotate therewith and a pivotal connection between said crank and said arms.

7. A machine as called for in claim 6 wherein said crank is connected to said arms intermediate the ends of the arms.

8. A machine as called for in claim 7 wherein the arms extend generally vertically, the lower ends of the arms being mounted on said slide for vertical sliding movement.

9. A machine as called for in claim 6 wherein the distance between the axes of the sun and planetary members is greater than the length of said crank.

10. A machine as called for in claim 9 wherein said diameter of said sun member is twice the diameter of said planetary member.

11. A machine as called for in claim 10 wherein the peripheral driving connection causes said planetary member to rotate about its own axis in a direction opposite to the direction of rotation around the axis of said sun member.

12. A machine as called for in claim 11 wherein the peripheral driving connection causes said planetary member to rotated about its own axis in a direction opposite to its direction of rotation around the axis of said sun member.

13. A machine as called for in claim 6 wherein said diameter of said sun member is twice the diameter of said planetary member.

14. A machine for loading long flexible strips of sheet stock onto a machine comprising a base, a support on said base on which a stack of said strips is adapted to be arranged such that the uppermost strip can be slid off the top of the stack, a pair of laterally spaced apart and generally parallel load arms mounted on the base for movement in a generally vertical plane, each of said arms having a generally vertically extending slot therein, a strip receiving device adjacent said arms having a pair of laterally spaced, generaly vertically extending slots therein, the slots in said arms and said receiving device having open upper ends for receiving and supporting said strips edgewise in a generally vertically oriented position, drive means carried by said base for moving said arms such that the slotted portions thereof remain in a generally vertically oriented position while moved in a generally elliptical path lying in a generally vertical plane and adjacent said stack and said receiving device, said path extending from above to below the slots in said strip receiving device, said arms at one location in said path being oriented such that the vertical slots therein are positioned to receive in edgewise position a strip slid off the top of the stack, said path having a portion wherein the slots in said arm move generally vertically downwardly into alignment with the slots in the strip receiving device so that, when the slotted portions of the arms move downwardly past the receiving device, the strip supported in the slots of said arms is deposited in the slots of the receiving device, said drive means having a stationary sun member on said base, a rotatable planetary member having its axis spaced from the axis of the sun member, means for rotating the planetary member around the axis of the sun member, means forming a peripheral driving connection between the sun and planetary members so that the planetary member rotates about its own axis when it is rotated around the axis of the sun member, a crank fixed relative to said planetary member to rotate therewith, a pivotal connection between said crank and said arms intermediate the ends of said arms, said arms extending generally vetically with the lower ends of said arms being mounted on said base for generally vertical sliding movement, the distance between the axis of the sun and planetary members being greater than the length of said crank.

15. A machine as called for in claim 14 wherein the diameter of the sun member is twice the diameter of the planetary member.

16. A machine as called for in claim 15 wherein the peripheral driving connection causes the planetary member to rotated about its own axis in a direction opposite to its direction of rotation around the axis of the sun member.

* * * * *